United States Patent
Nam et al.

(10) Patent No.: US 8,059,063 B2
(45) Date of Patent: Nov. 15, 2011

(54) BARRIER DEVICE, AUTOSTEREOSCOPIC DISPLAY USING THE SAME AND DRIVING METHOD THEREOF

(75) Inventors: Hui Nam, Suwon-si (KR); Jang-Doo Lee, Suwon-si (KR); Hyoung-Wook Jang, Suwon-si (KR); Beom-Shik Kim, Suwon-si (KR); Myoung-Seop Song, Suwon-si (KR)

(73) Assignee: Samsung Mobile Display Co., Ltd., Suwon-si (KR)

( * ) Notice: Subject to any disclaimer, the term of this patent is extended or adjusted under 35 U.S.C. 154(b) by 1650 days.

(21) Appl. No.: 11/355,372

(22) Filed: Feb. 15, 2006

(65) Prior Publication Data

US 2006/0197725 A1 Sep. 7, 2006

(30) Foreign Application Priority Data

Mar. 4, 2005 (KR) .................. 10-2005-0018210

(51) Int. Cl.
*G09G 3/36* (2006.01)
(52) U.S. Cl. .................. 345/6; 348/42; 348/51; 348/54; 349/15; 359/13; 359/462; 359/481; 359/629
(58) Field of Classification Search .................. 345/4–9; 348/42, 51, 54, 115; 349/15; 359/13, 462–464, 359/480, 481, 629, 630, 632
See application file for complete search history.

(56) References Cited

U.S. PATENT DOCUMENTS 5,581,378 A * 12/1996 Kulick et al. ..................... 359/9
5,949,390 A * 9/1999 Nomura et al. .................. 345/32
6,137,456 A * 10/2000 Bhagavatula et al. ............ 345/7
2001/0012054 A1 * 8/2001 Sudo .............................. 348/51
2007/0019119 A1 * 1/2007 Tanaka et al. ................... 349/15

FOREIGN PATENT DOCUMENTS

| JP | 08-331605 | 12/1996 |
| JP | 09-015549 | 1/1997 |
| JP | 09-159970 | 6/1997 |

(Continued)

OTHER PUBLICATIONS

Patent Abstracts of Japan, Publication No. 2005-258013; Date of Publication: Sep. 22, 2005; in the name of Tomoo Takatani et al.

(Continued)

*Primary Examiner* — Amare Mengistu
*Assistant Examiner* — Jennifer Zubajlo
(74) *Attorney, Agent, or Firm* — Christie, Parker & Hale, LLP

(57) ABSTRACT

A 3D image display device includes a display panel, a barrier, a controller, and a barrier driver. The barrier includes: a first substrate; a plurality of first electrodes disposed on the first substrate and extended in a first direction; a plurality of second electrodes respectively disposed between adjacent first electrodes; a second substrate opposing the first substrate; a plurality of third electrodes disposed on the second substrate and extended in a second direction crossing the first direction; a plurality of fourth electrodes respectively disposed between adjacent third electrodes; and a liquid crystal layer disposed between the first and second substrates. The barrier driver receives a barrier control signal from the controller, and applies a reference voltage to the first electrodes, the second electrodes, the third electrodes, and/or the fourth electrodes, and applies a liquid crystal driving voltage to one or more other ones of the first to fourth electrodes.

17 Claims, 11 Drawing Sheets

FOREIGN PATENT DOCUMENTS

| | | |
|---|---|---|
| JP | 09-281440 | 10/1997 |
| JP | 2003-185991 | 7/2003 |
| JP | 2005-258013 | 9/2005 |
| JP | 2005258013 A * | 9/2005 |
| KR | 10-2004-0049823 | 6/2004 |

OTHER PUBLICATIONS

Korean Patent Abstracts, Publication No. 1020040049823 A; Date of Publication: Jun. 12, 2004; in the name of Diana U. Kean et al.

* cited by examiner

BARRIER DEVICE, AUTOSTEREOSCOPIC DISPLAY USING THE SAME AND DRIVING METHOD THEREOF

CROSS-REFERENCE TO RELATED APPLICATION

This application claims priority to and the benefit of Korean Patent Application No. 10-2005-0018210 filed on Mar. 4, 2005 in the Korean Intellectual Property Office, the entire content of which is incorporated herein by reference.

BACKGROUND OF THE INVENTION

1. Field of the Invention

The present invention relates to a barrier device and a 3D image display device using the same for displaying a 3D image by using binocular disparity. More particularly, the present invention relates to a barrier device and a 3D image display device using the same, which are able to change barrier shape.

2. Description of the Related Art

In general, people perceive a stereoscopic effect physiologically and experientially. In three-dimensional image display technology, a stereoscopic effect of an object is produced by using binocular parallax, which is a primary factor in recognizing a stereoscopic effect at a short distance. Stereoscopic images are viewed by a stereoscopic method that involves wearing of spectacles or by an autostereoscopic method that does not involve wearing of spectacles.

The stereoscopic method is classified into an anaglyph method that involves wearing of spectacles having blue and red lenses on respective sides, a polarization method that involves wearing of polarizing spectacles having different polarization directions, and a time-division method that involves wearing of spectacles including an electronic shutter synchronized with intervals by which a frame is repeated time-divisionally. As such, each stereoscopy method requires the inconvenience of wearing the spectacles, and causes difficulty of viewing objects other than the stereoscopic image. Accordingly, the autostereoscopic method that does not involve wearing of spectacles has been actively developed.

The typical autostereoscopy methods generally obtain a stereoscopic effect by separating left-eye and right-eye images using a barrier.

In the barrier, opaque regions and transparent regions are repeatedly arranged, and an image display panel is formed of pixels corresponding to a right eye, and pixels corresponding to a left eye.

An observer sees an image displayed on the image display panel through the transparent regions of the barrier. Here, the left eye and the right eye of the observer respectively see different regions of the image display panel, even though the image may pass through the same transparent region.

There are two types of arrangements for the opaque regions and the transparent regions of the barrier. They are a stripe type arrangement and a zigzag type arrangement. In the stripe type barrier, the opaque regions and the transparent regions, which are extended in one direction, are formed alternately. The stripe type barrier has disadvantages in that a horizontal resolution is at most half of a vertical resolution, and a displayed image gives a burden to the observer's eyes because a vertical stripe pattern appears in the displayed image. Recently, display devices capable of rotating its screen between a vertically long portrait screen mode and a horizontally long landscape screen mode have been developed. Specifically, the landscape screen mode is typically used for playing games, watching TV or motion pictures, and using the screen to see wide pictures captured by a built-in digital camera. However, the barrier is manufactured to be suitable for only one of the portrait and landscape modes. Therefore, the 3D images are not available on a screen of the landscape mode when a barrier for the portrait mode is combined with the display device.

To solve this problem, a zigzag type barrier, in which the opaque regions and the transparent regions are arranged in the zigzag shape, has been developed.

However, the zigzag type barrier has a drawback of a narrow viewing angle whereas it has improved horizontal resolution. Also, though it may be available for both of the portrait mode screen and the landscape mode screen, when the screen is changed to the landscape mode while the display mode of the barrier is fixed, a 3D image may not be displayed correctly depending on the position of left eye pixels and right eye pixels of the display panel, and the position of opaque regions and transparent regions of the barrier.

For those reasons, it has been difficult to popularize the 3D image display device. Accordingly, it is highly desirable to develop a barrier that is adaptive to display 3D images in various schemes.

The above information disclosed in this Background section is only for enhancement of understanding of the background of the invention and therefore it may contain information that does not form the prior art that is already known in this country to a person of ordinary skill in the art.

SUMMARY OF THE INVENTION

One aspect of the present invention is to provide barrier devices, 3D image display devices, and driving methods thereof.

The barrier devices, the 3D image display devices, and the driving method thereof according to the exemplary embodiments of the present invention have a feature in that a pattern of a barrier can be changed according to the user's choice.

An exemplary 3D image display device according to an embodiment of the present invention includes a display panel, a barrier, a controller, and a barrier driver.

The display panel displays an image corresponding to an input video signal.

The barrier is arranged in correspondence to the display panel. The barrier includes: a first substrate; a plurality of first electrodes disposed on the first substrate and extended in a first direction; a plurality of second electrodes respectively disposed between adjacent ones of the first electrodes on the first substrate; a second substrate opposing the first substrate; a plurality of third electrodes disposed on the second substrate and extended in a second direction crossing the first direction; a plurality of fourth electrodes respectively disposed between adjacent ones of the third electrodes on the second substrate; and a liquid crystal layer disposed between the first substrate and the second substrate.

The controller generates a barrier control signal for determining a pattern of the barrier.

The barrier driver applies, based on the barrier control signal, a reference voltage to the first electrodes, the second electrodes, the third electrodes, and/or the fourth electrodes, and applies a liquid crystal driving voltage to the first electrodes, the second electrodes, the third electrodes and/or the fourth electrodes to which the reference voltage is not applied.

The barrier control signal may determine the pattern of the barrier to be a stripe shape or a zigzag shape.

The barrier driver, in response to the barrier control signal for the stripe shape, may apply the reference voltage to the first electrodes and the second electrodes, and may apply the liquid crystal driving voltage to the third electrodes or the fourth electrodes.

The barrier driver, in response to the barrier control signal for the zigzag shape, may apply the reference voltage to the first electrodes and the third electrodes, and may apply the liquid crystal driving voltage to the second electrodes and the fourth electrodes.

The reference voltage may be a ground voltage, and the liquid crystal driving voltage may be an alternating voltage between a positive voltage and a negative voltage with a predetermined frequency.

The display panel may be convertible between a portrait mode and a landscape mode, and the barrier control signal may be determined with reference to the modes in which the display panel is being driven.

An exemplary barrier device according to another embodiment of the present invention is used for a 3D image display panel for displaying a 3D image by using a binocular disparity.

The barrier device includes a barrier, a barrier driver, and a controller.

The barrier includes: a first substrate on which a plurality of first electrodes and a plurality of second electrodes are disposed; a second substrate on which a plurality of third electrodes and a plurality of fourth electrodes are disposed; and a liquid crystal layer disposed between the first substrate and the second substrate.

The barrier driver applies a first driving voltage to the first electrodes, the second electrodes, the third electrodes, and/or the fourth electrodes, and applies a second driving voltage to the first electrodes, the second electrodes, the third electrodes, and/or the fourth electrodes to which the first driving voltage is not applied.

The controller generates a barrier control signal for determining a pattern of the barrier and transmits the barrier control signal to the barrier driver.

An exemplary driving method for a 3D image display device according to a further embodiment of the present invention includes steps a), b), c), and d) below.

Here, the barrier includes a first substrate and a second substrate.

On the first substrate, a plurality of first electrodes are disposed, the first electrodes being extended in a first direction and being apart from each other by a predetermined gap, and a plurality of second electrodes are respectively disposed between adjacent ones of the first electrodes.

On the second substrate, a plurality of third electrodes are disposed, the third electrodes being extended in a second direction crossing the first direction and being apart from each other by a predetermined gap, and a plurality of fourth electrode are respectively disposed between adjacent ones of the third electrodes.

In the a), a first driving voltage is applied to the first electrodes and the second electrodes, while a second driving voltage is concurrently applied to the third electrodes or the fourth electrodes.

In the b), an image corresponding to the video signal is displayed on the display panel.

In the c), the first driving voltage is applied to the first electrodes and the third electrodes, while the second driving voltage is concurrently applied to the second electrodes and the fourth electrodes.

In the d), an image corresponding to the video signal is displayed on the display panel.

DETAILED DESCRIPTION OF THE EMBODIMENTS

Figure 1:
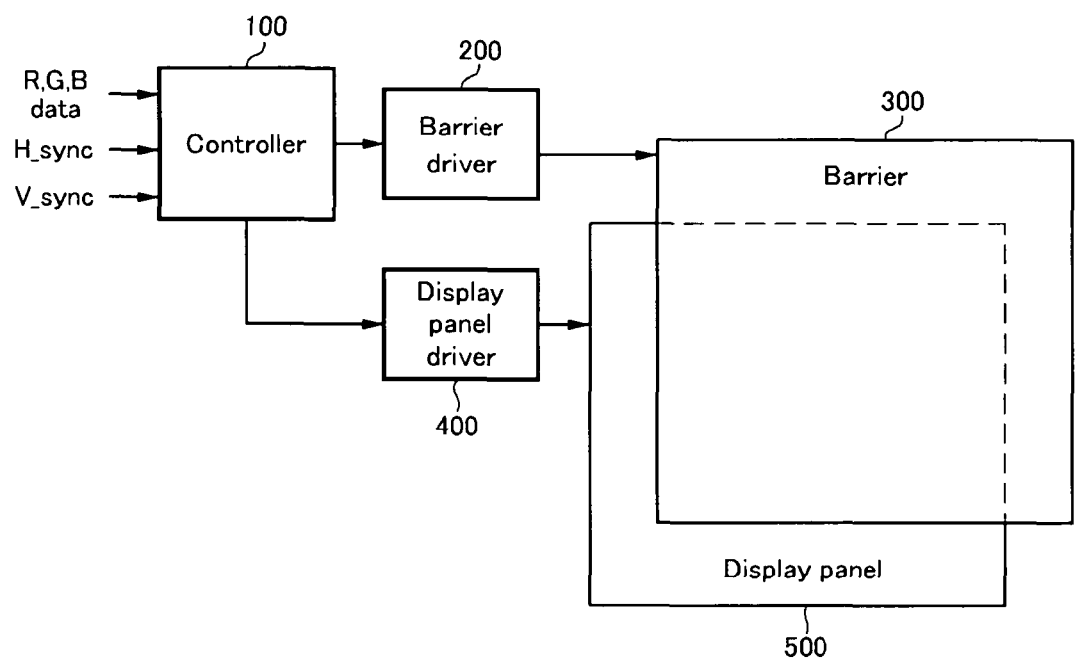
FIG. 1 shows a block diagram of a 3D image display device according to an exemplary embodiment of the present invention.

Certain exemplary embodiments of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a block diagram of a 3D image display device according to an exemplary embodiment of the present invention.

The 3D image display device includes a controller 100, a barrier driver 200, a barrier 300, a display panel driver 400, and a display panel 500.

The controller 100 generates a barrier control signal and a display panel control signal and respectively transmits them to the barrier driver 200 and the display panel driver 400 after receiving an image signal (R, G, and B data), a horizontal synchronization signal (H_sync), and a vertical synchronization signal (V_sync).

The display panel driver 400 drives the display panel 500 using the control signal received from the controller 100. In further detail, the display panel driver 400 drives the display panel 500 so as to normally display the inputted image signal (R, G, and B data) on the display panel 500. Any suitable image display panel may be used as the display panel 500. In more detail, the display panel 500 is capable of displaying a 3D image by dividing a left eye image and a right eye image corresponding to the input 3D image signal (R, G, and B data). As the display panel 500, any suitable one of various display panels can be used, for example, a liquid crystal display panel, a plasma display panel, and a light emitting display panel, etc.

The barrier driver 200 drives the barrier 300 using the control signal received from the controller 100. In more detail, the barrier driver 200 drives the barrier 300 to have the stripe shape (or pattern) or zigzag shape (or pattern) in accordance with the display mode of the barrier 300 determined by the controller 100.

The barrier 300 may have an electrode format of a stripe type or a zigzag type (similar to a checkerboard pattern). Such a structure and a format of the barrier 300 will be describe in reference to FIG. 2, FIG. 3A and FIG. 3B.

Figure 2:
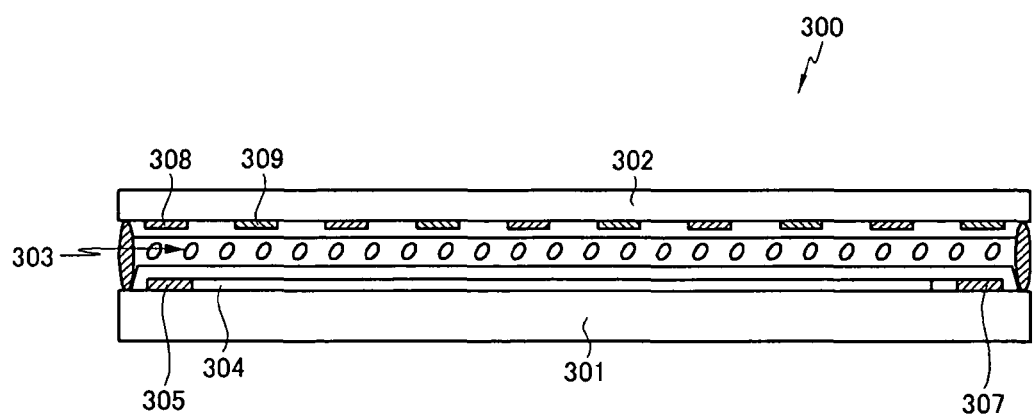
FIG. 2 illustrates a cross-sectional view of a barrier according to a first exemplary embodiment of the present invention.
Figure 3A:
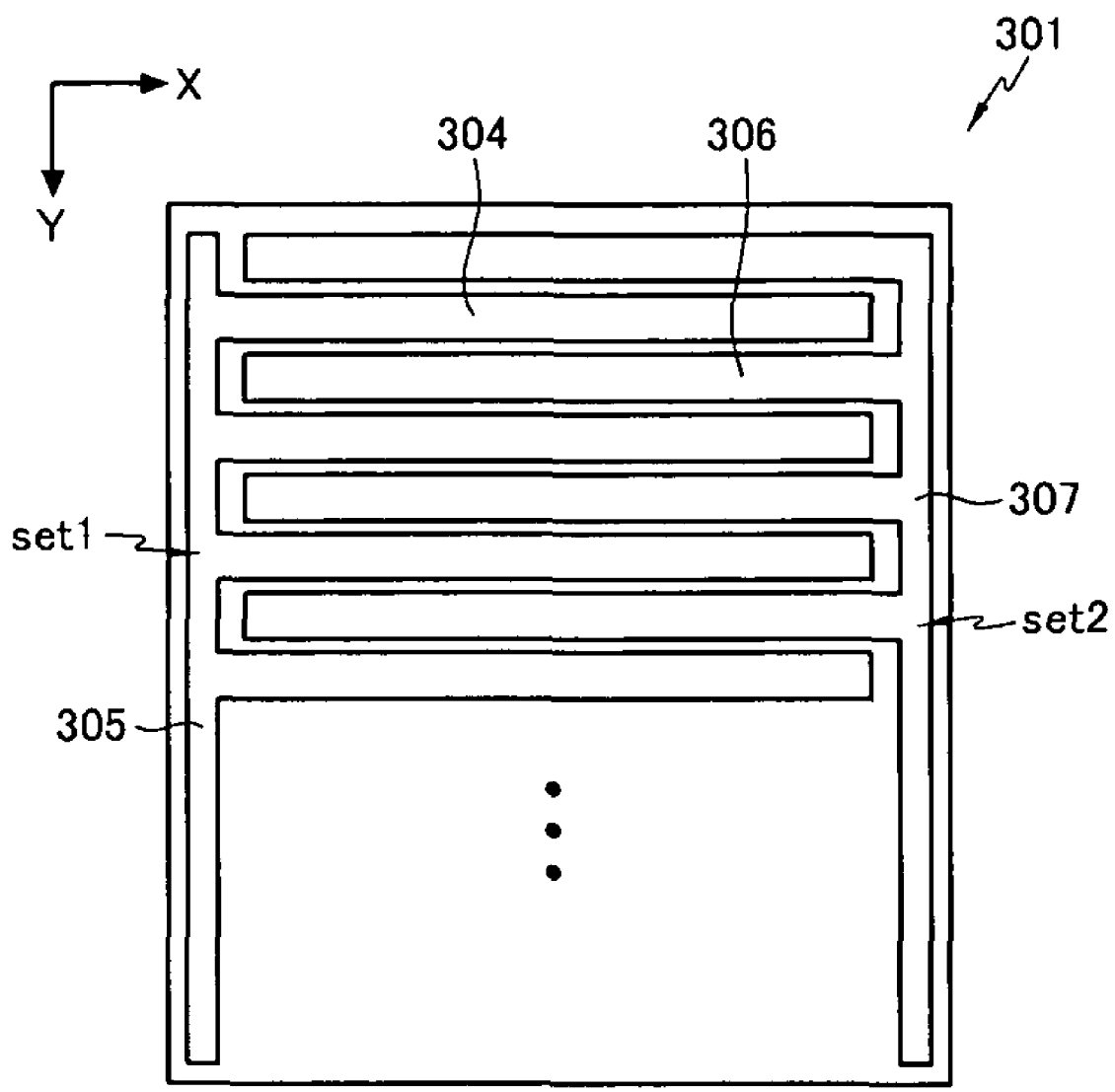
FIG. 3A illustrates a structure of electrodes formed on a first substrate.
Figure 3B:
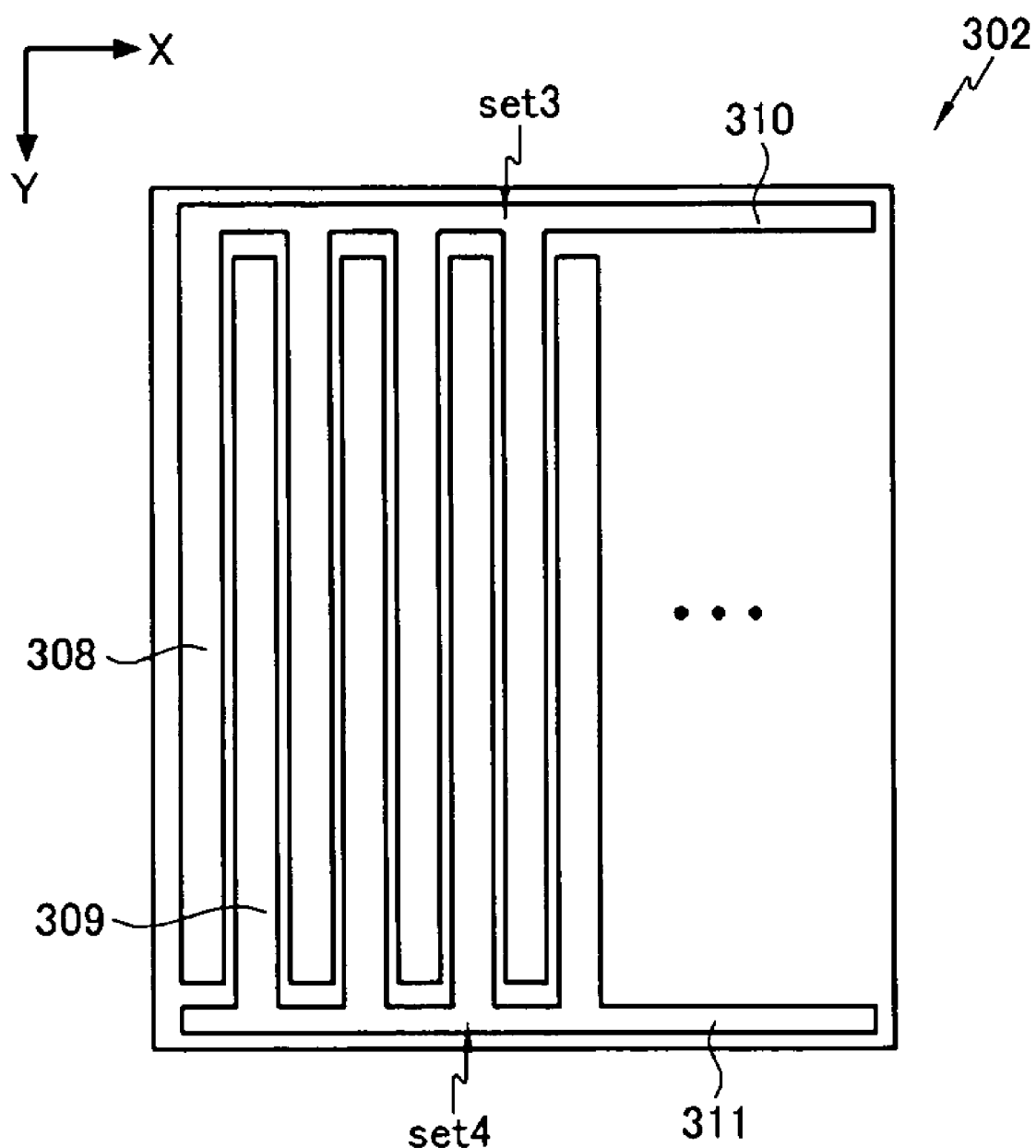
FIG. 3B illustrates a structure of electrodes formed on a second substrate.

FIG. 2 illustrates a cross-sectional view of a barrier according to a first exemplary embodiment of the present invention. FIG. 3A illustrates a structure of electrodes formed on a first substrate 301, and FIG. 3B illustrates a structure of electrodes formed on a second substrate 302.

As shown in FIG. 2, the barrier 300 includes the first substrate 301, and the second substrate 302, which are arranged with a predetermined space or gap therebetween. In the present exemplary embodiment, the first substrates 301 and the second substrate 302 may use substrates of a rectangular shape having a pair of short sides and a pair of long sides.

Electrodes 304, 305, 306, 307, 308 and 309 for driving a liquid crystal 303 placed between the first substrate 301 and the second substrate 302 are formed on surfaces of the first substrate 301 and the second substrate 302 that face each other. The electrodes 304, 305, 306, 307, 308 and 309 can be formed of transparent material such as indium tin oxide (ITO). Hereinafter, the electrodes will be described in detail.

As shown in FIG. 2 and FIG. 3A, a plurality of first electrodes 304 formed on the first substrate 301 are arranged in a first direction of the first substrate 301 (i.e., the first direction corresponds to the short side of the first substrate 301, X-axis direction in FIG. 3A). The first electrodes 304 are formed on the first substrate 301 in a stripe pattern with a predetermined interval between each pair of neighboring electrodes. The first connecting electrode 305 is extended in a second direction (i.e., a direction crossed with the first direction, Y-axis direction in FIG. 3A) on the first substrate 301, and is coupled to one end of each of the first electrodes 304. The first electrodes 304 and the first connecting electrode 305 form a first electrode set set 1.

Similarly, on the first substrate 301, a second electrode set set 2 including second electrodes 306 and a second connecting electrode 307 is also formed. In more detail, a plurality of the second electrodes 306 formed on the first substrate 301 are arranged in the first direction of the first substrate 301 (i.e., X-axis direction in FIG. 3A). The second electrodes 306 are formed in the stripe pattern, and are respectively placed between the first electrodes 304. The second connecting electrode 307 is extended in the second direction (i.e., the direction crossed with the first direction, Y-axis direction in FIG. 3A) on the first substrate 301, and is coupled to one end of each of the second electrodes 306.

The first electrode set set 1 and the second electrode set set 2 substantially cover an entire area, which corresponds to the display area of the display panel 500, except predetermined intervals provided between the first electrodes 304 and the second electrodes 306.

Similarly, as shown in FIG. 2 and FIG. 3B, a third electrode set set 3 and a fourth electrode set set 4 are formed on the surface of the second substrate 302 that faces the first substrate 301.

The third electrode set set 3 includes a plurality of third electrodes 308 arranged in a vertical direction (i.e., Y-axis direction in FIG. 3B) of the second substrate 302, and a third connecting electrode 310 coupled to the third electrodes 308. The fourth electrode set 4 includes a plurality of fourth electrodes 309 arranged in a vertical direction of the second substrate 302, and a fourth connecting electrode 311 coupled to the fourth electrodes 309.

Here, the third electrodes 308 and the fourth electrodes 309 are arranged in the vertical Y-axis direction in a stripe pattern. In other words, when the first substrate 301 and the second substrate 302 are assembled together, the first electrodes 304 and the second electrodes 306, and the third electrodes 308 and the fourth electrodes 309 cross over with each other at 90 degrees.

The third electrode set set 3 and the fourth electrode set set 4 substantially cover an entire area, which corresponds to the display area of the display panel 500, except predetermined intervals provided between the third electrodes 308 and the fourth electrodes 309.

A driving method for the barrier 300 driven by the barrier driver 200 according to the first exemplary embodiment of the present invention will be described in detail, with references to FIG. 4A, FIG. 4B, FIG. 4C and FIG. 5A, FIG. 5B, FIG. 5C.

In the following description, it is assumed that liquid crystal of the barrier 300 is in a normally black state. When in a normally white state, the opaque regions and the transparent regions are provided inversely to those in the normally black state. In other words, the opaque regions and the transparent regions are switched.

A case where the barrier driver 200 drives the barrier 300 in a stripe type arrangement or format will be described with references to FIG. 4A to FIG. 4C.

Figure 4A:
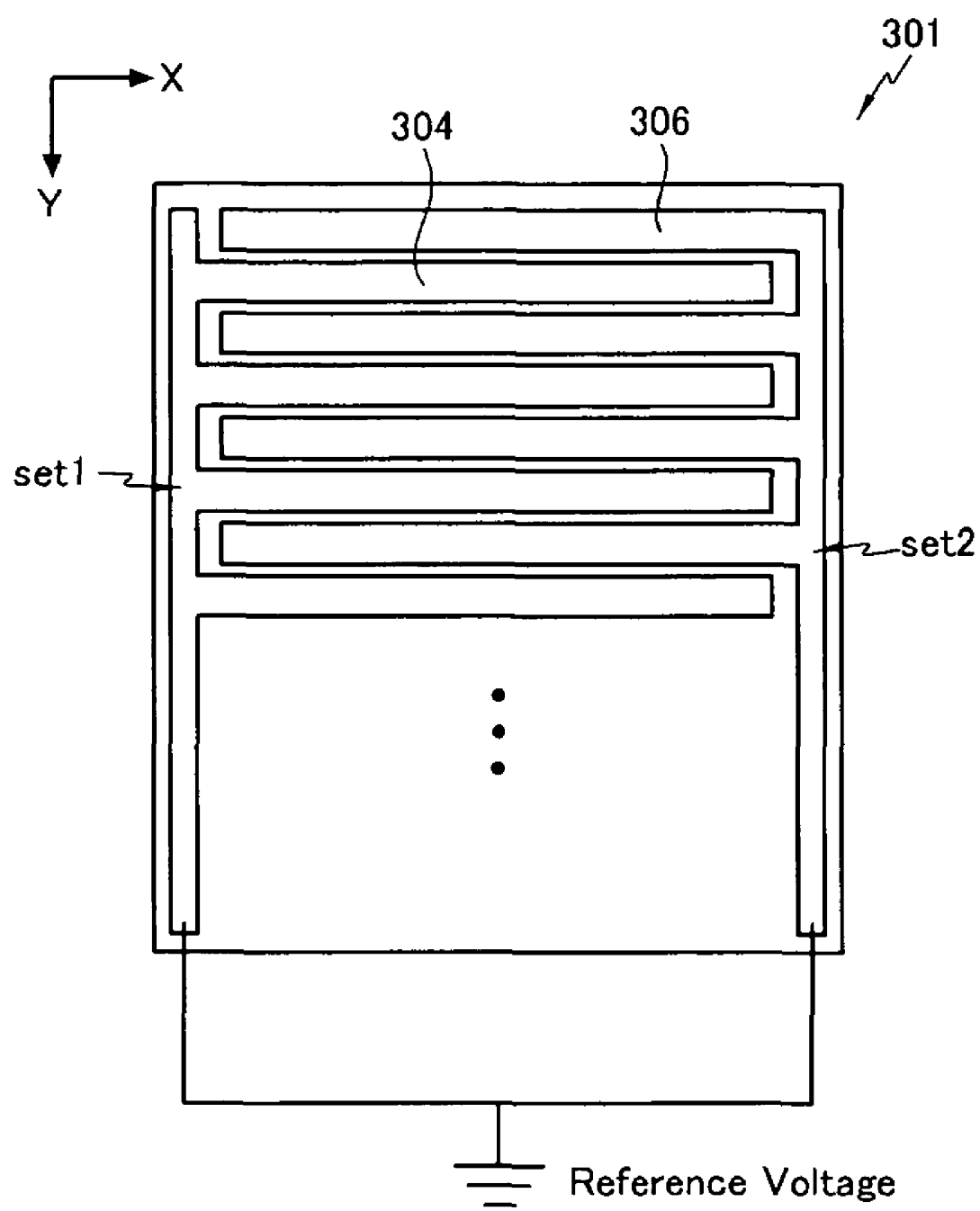
FIG. 4A and FIG. 4B show that a voltage is applied to each electrode of the barrier according to the first exemplary embodiment of the present invention.
Figure 4B:
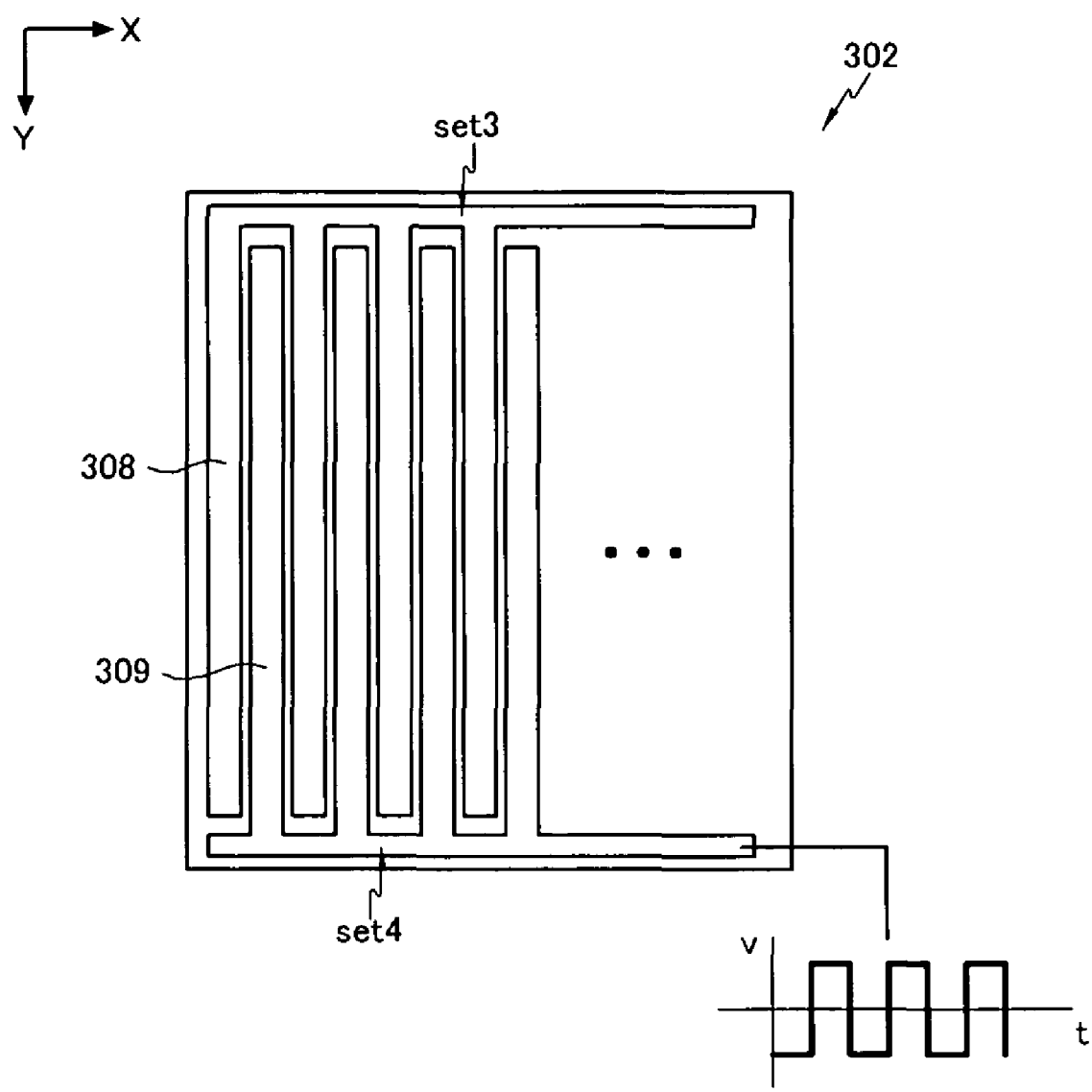
Figure 4C:
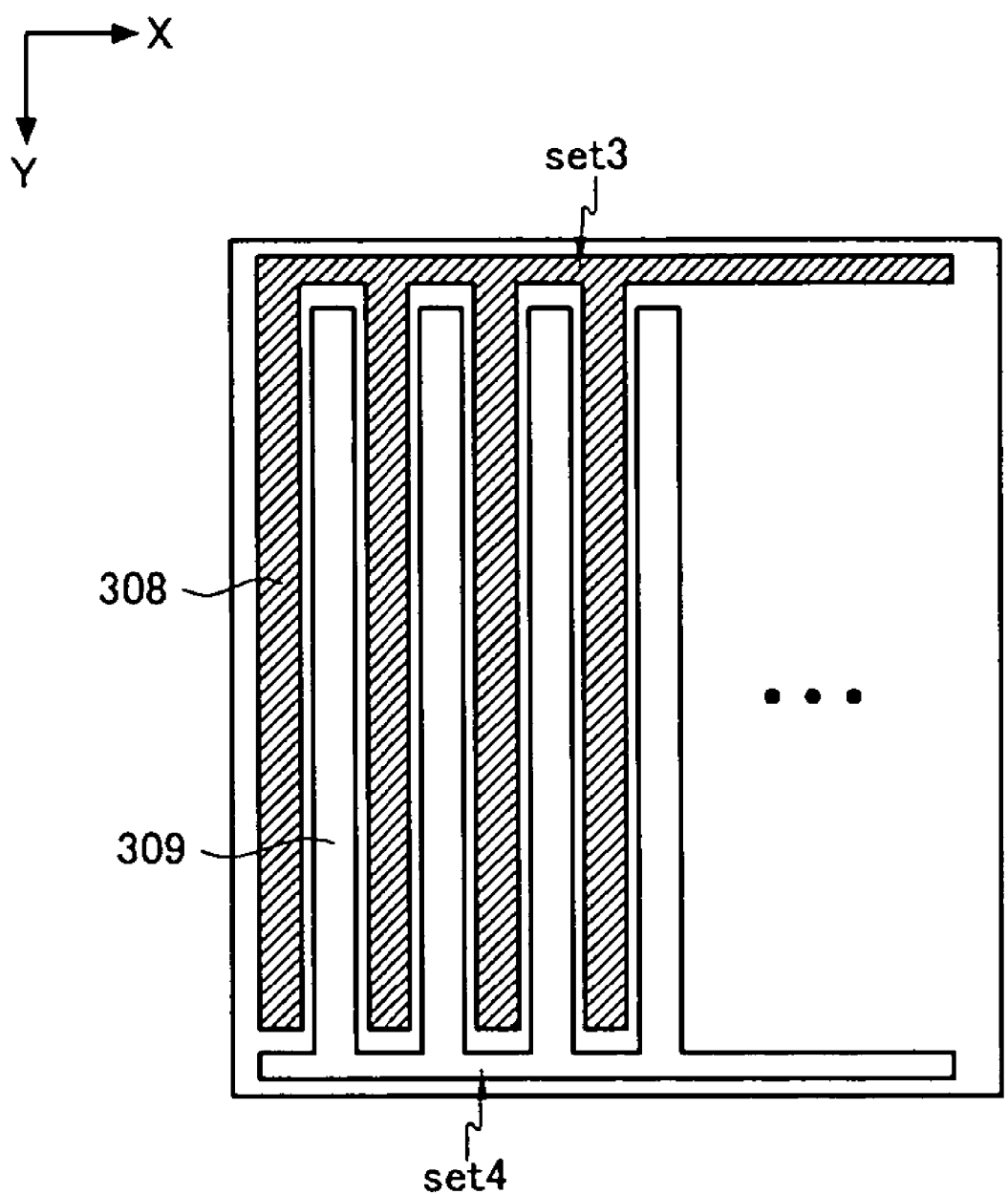
FIG. 4C illustrates a barrier driven in a stripe shape according to the first exemplary embodiment of the present invention.

FIG. 4A and FIG. 4B show voltages to be applied to the electrodes of the barrier 300, and FIG. 4C shows the barrier that is driven in a stripe type arrangement.

As shown in FIG. 4A and FIG. 4B, the barrier driver 200 applies a reference voltage (i.e., a first driving voltage) to the first electrode set set 1 and the second electrode set set 2 of the first substrate 301, and applies a liquid crystal driving voltage (i.e., a second driving voltage) to one of the third electrode set set 3 and the fourth electrode set set 4 of the second substrate 302. In the present exemplary embodiment, the case where the liquid crystal driving voltage is applied to the fourth electrode set set 4 will be described below, but it is of course possible that the liquid crystal driving voltage is applied to the third electrode set set 3. Here, the reference voltage can be the ground voltage, and as shown in FIG. 4B, the liquid crystal driving voltage can be a square wave voltage that alternates between a positive voltage and a negative voltage with a predetermined frequency.

By driving like this, the first and second electrode sets set 1 and set 2 that substantially cover the display area of the first substrate 301 perform as common electrodes, and the fourth electrode set set 4 of the second substrate 302 performs as driving electrodes for the liquid crystal. Because the liquid crystal of the barrier 300 is in a normally black state, regions corresponding to the fourth electrodes become transparent regions, and regions corresponding to the third electrodes become opaque regions. Accordingly, as shown in FIG. 4C, the barrier 300 is driven to have a stripe shape, in which the transparent regions are extended in the Y-axis direction.

Next, the case where the barrier driver 200 drives the barrier 300 in a zigzag type arrangement or format will be described with reference to FIG. 5A to FIG. 5C.

Figure 5A:
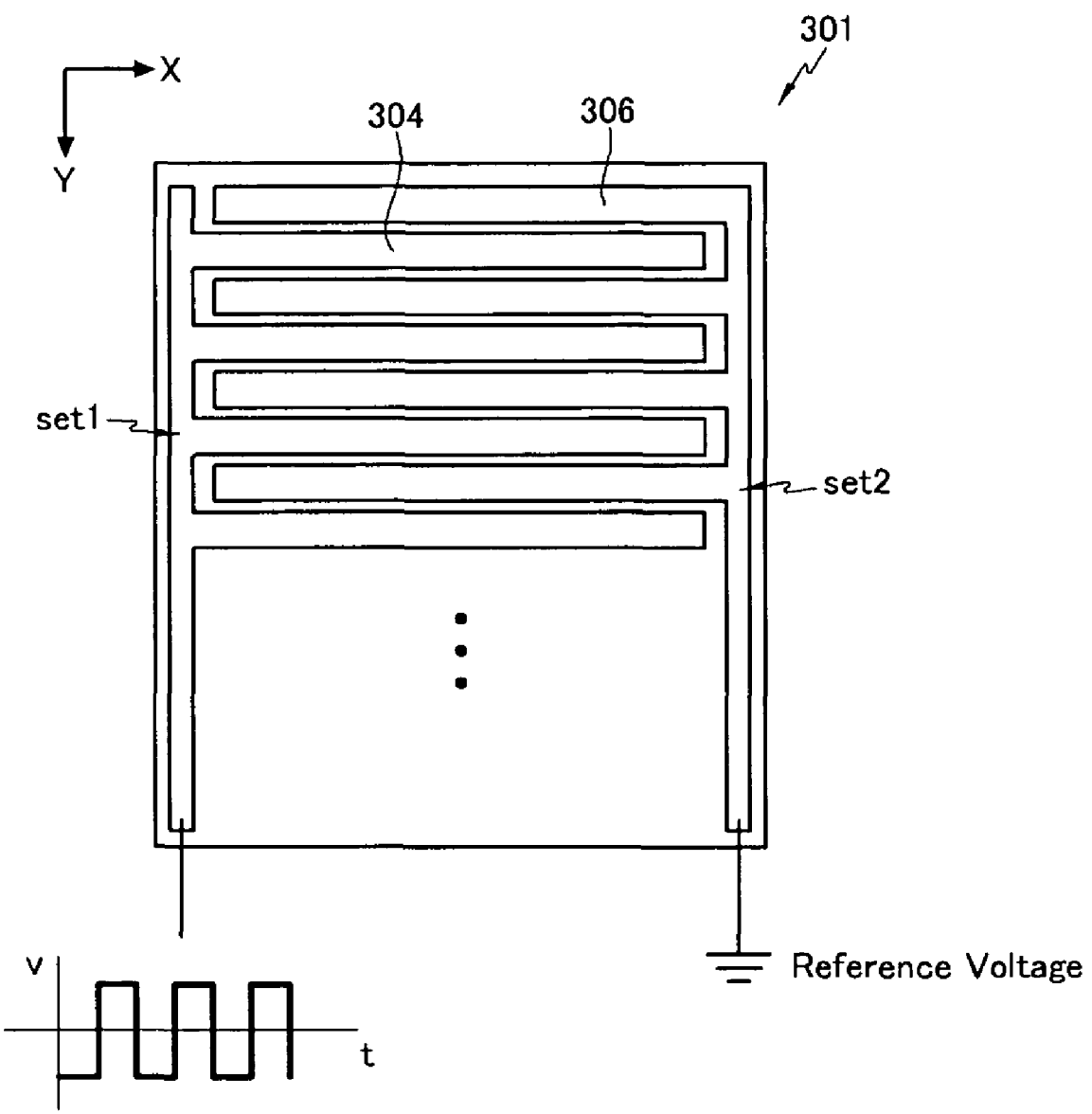
FIG. 5A and FIG. 5B show that a voltage is applied to each electrode of the barrier according to the first exemplary embodiment of the present invention.
Figure 5B:
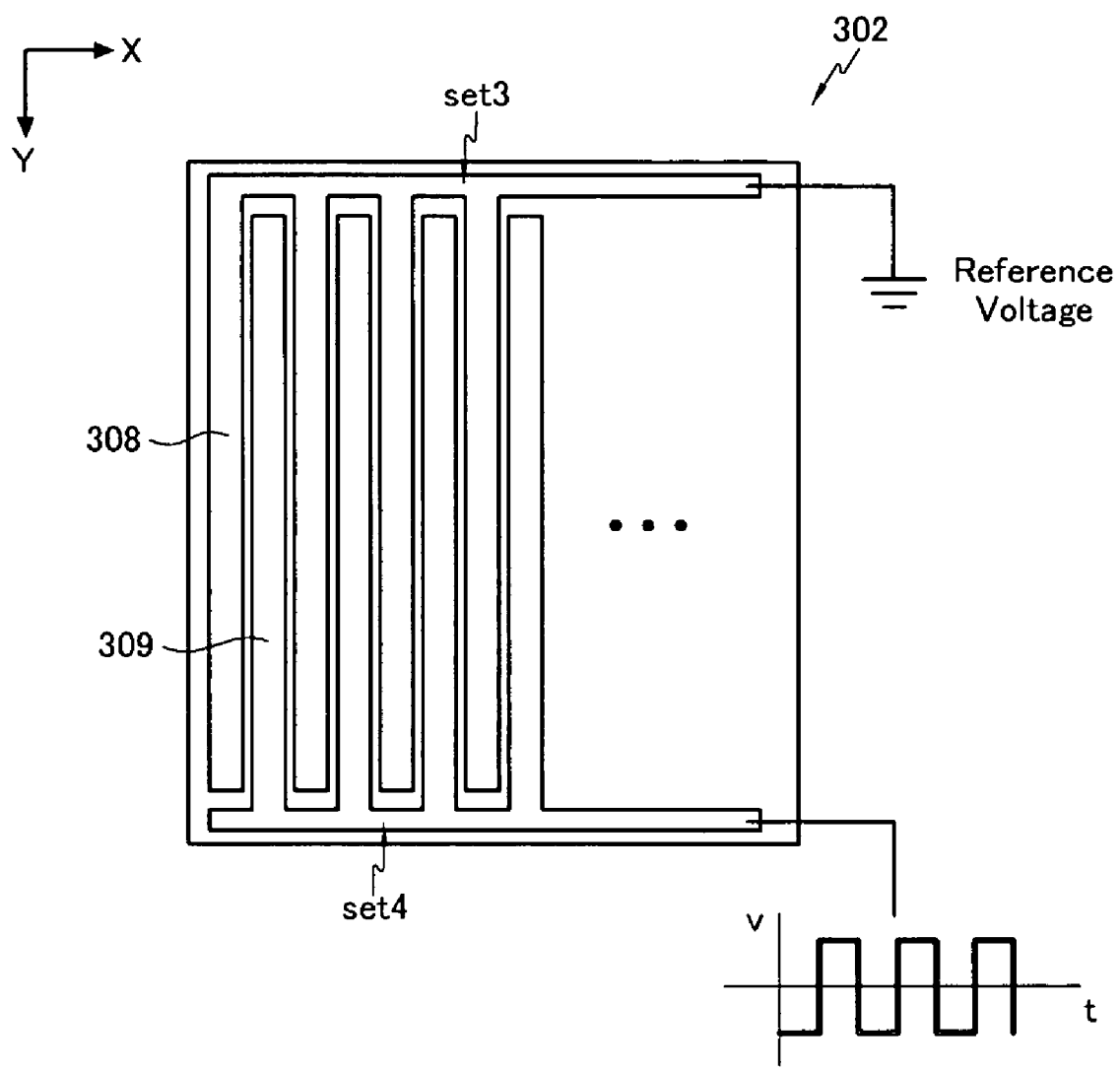
Figure 5C:
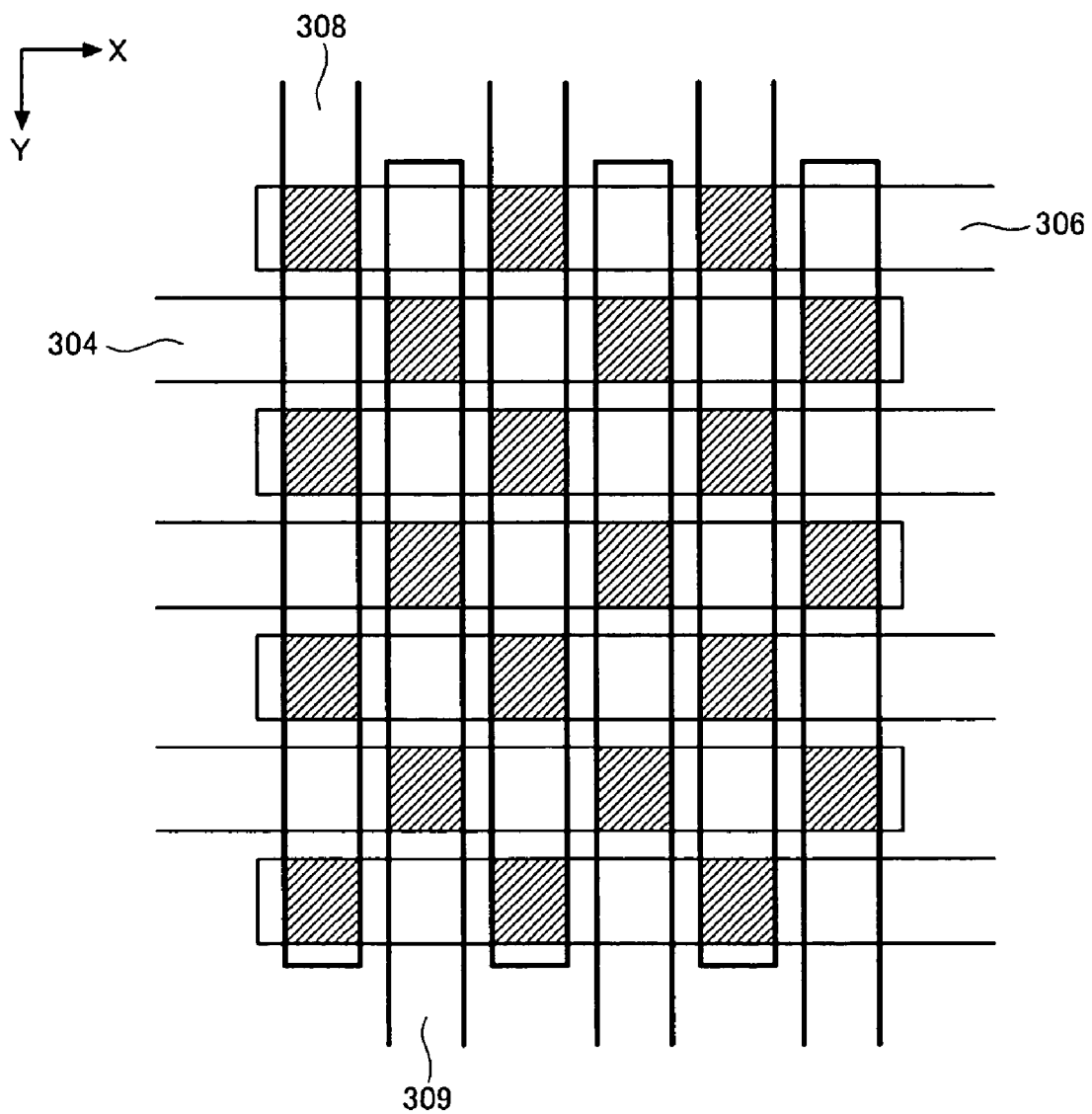
FIG. 5C illustrates a barrier driven in a zigzag shape according to the first exemplary embodiment of the present invention.

FIG. 5A and FIG. 5B show that a voltage is applied to each electrode of the barrier, and FIG. 5C illustrates the barrier 300 that is driven to have a zigzag shape (similar to a checkerboard pattern).

As shown in FIG. 5A and FIG. 5B, the barrier driver 200 applies a reference voltage to the second electrode set set 2 of the first substrate 301 and the third electrode set set 3 of the second substrate 302, and applies a liquid crystal driving voltage to the first electrode set set 1 of the first substrate 301 and the fourth electrode set set 4 of the second substrate 302.

By driving like this, because a voltage difference does not occur in overlapped regions of the second electrodes 306 and the third electrodes 308 to which the reference voltage is applied, the overlapped regions of the second electrodes 306 and the third electrodes 308 will become opaque regions when the barrier 300 is in a normally black state. Similarly, because a voltage difference does not occur in overlapped regions of the first electrodes 304 and the fourth electrodes 309 to which the liquid crystal driving voltage is applied, the overlapped regions of the first electrodes 304 and the fourth electrodes 309 will become opaque regions when the barrier 300 is in the normally black state.

On the other hand, a voltage difference occurs in overlapped regions of the second electrodes 306 and the fourth electrodes 309 such that the liquid crystal is driven, because the reference voltage is applied to the second electrodes 306 and the liquid crystal driving voltage is applied to the fourth electrodes 309. Accordingly, the overlapped regions of the second electrodes 306 and the fourth electrodes 309 will become transparent regions. Similarly, a voltage difference occurs in overlapped regions of the first electrodes 304 and the third electrodes 308 such that the liquid crystal is driven, because the liquid crystal driving voltage is applied to the first electrodes 304 and the reference voltage is applied to the third electrodes 308. Accordingly, the overlapped regions of the first electrodes 304 and the third electrodes 308 will become transparent regions.

As described above, because the opaque regions that intercept light are formed in the zigzag shape, a barrier having the zigzag shape (similar to a checkerboard pattern) which is able to increase resolution in a horizontal direction can be provided.

A driving method for the barrier 300 driven by the barrier driver 200 according to the second exemplary embodiment of the present invention will be described in detail with references to FIG. 6 and FIG. 7.

The first exemplary embodiment of the present invention provides a driving method for the barrier when the image is displayed in the portrait mode in which the screen is longer in the vertical direction. The second exemplary embodiment of the present invention provides another driving method for the barrier when the image is displayed in the landscape mode in which the screen is longer in the horizontal direction. Therefore, FIG. 6 and FIG. 7 are figures that are rotated by 90 degrees of FIG. 4C and FIG. 5, such that X-axis indicates the vertical direction, and Y-axis indicates the horizontal direction.

Figure 6:
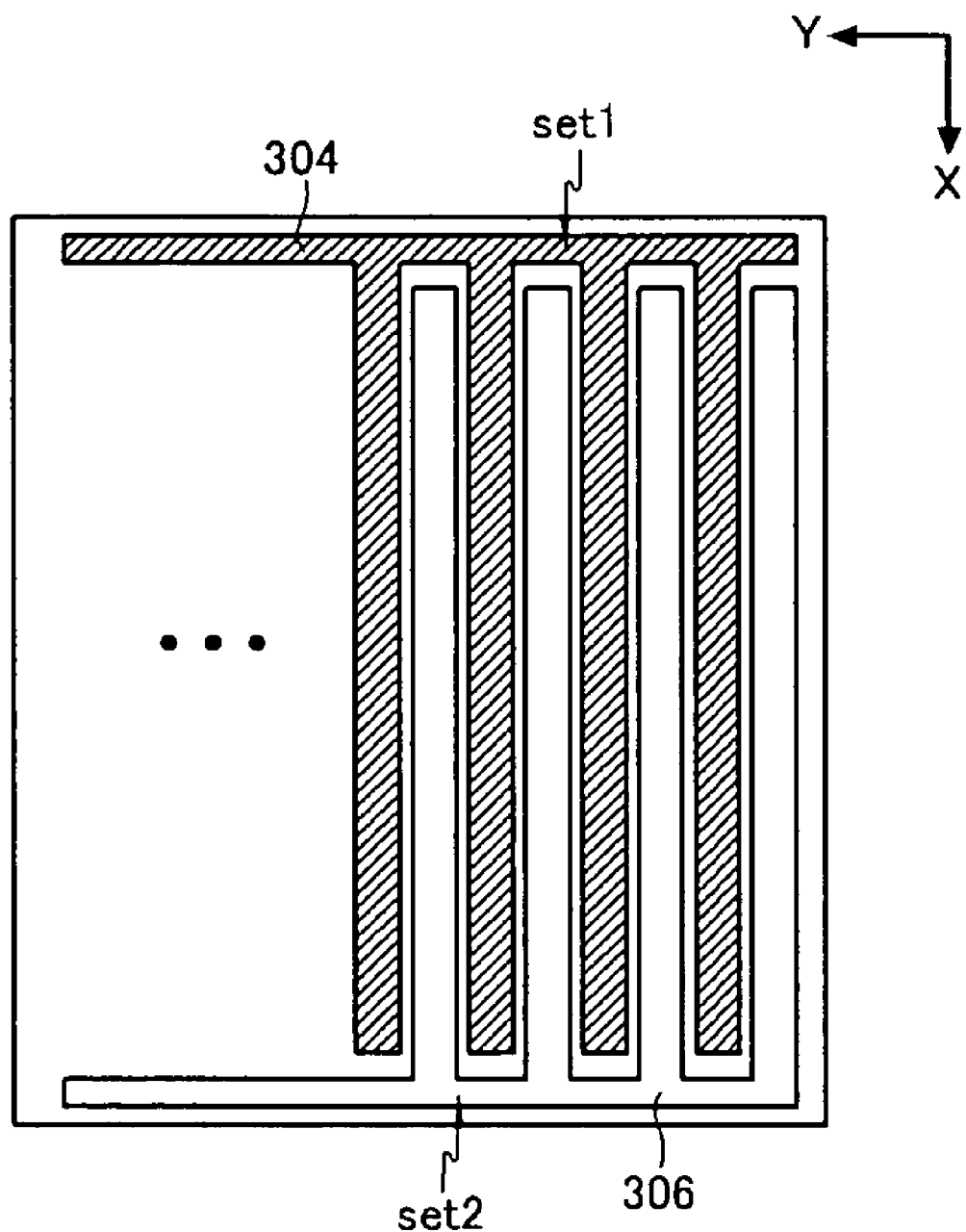
FIG. 6 shows a barrier driven in a stripe shape according to the second exemplary embodiment of the present invention.

FIG. 6 shows the barrier 300 that is driven to have a stripe shape according to the second exemplary embodiment of the present invention.

The barrier driver 200 applies the liquid crystal driving voltage to one of the first electrode set set 1 and the second electrode set set 2 of the first substrate 301. For example, the barrier driver 200 applies the liquid crystal driving voltage to the second electrode set set 2, and applies the reference voltage to the third electrode set set 3 and the fourth electrode set set 4 of the second substrate 302.

By driving like this, the third and fourth electrode sets set 3 and set 4 that substantially cover the display area of the second substrate 302 perform as common electrodes, and the second electrode set set 2 of the first substrate 301 performs as liquid crystal driving electrodes. Here, regions for the second electrodes become the transparent regions, and regions for the first electrodes become the opaque regions, when the liquid crystal of the barrier 300 is in a normally black state.

As shown in FIG. 6, the barrier 300 has the stripe pattern in which the transparent regions are extended in the X-axis direction. Therefore, the barrier 300 is driven in an appropriate form for the landscape mode screen which is rotated 90 degrees from the portrait mode screen shown in FIG. 4C.

Figure 7:
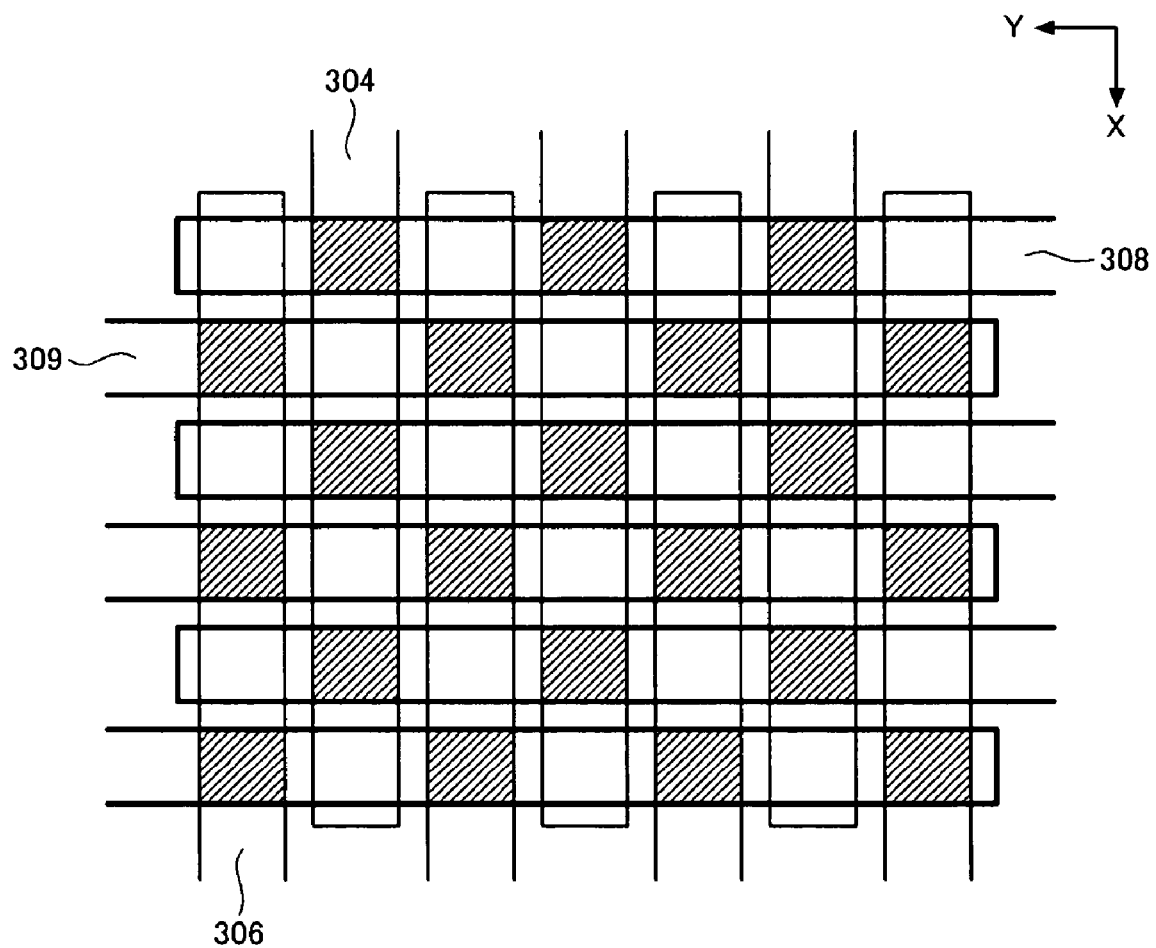
FIG. 7 shows a barrier driven in a zigzag shape according to the second exemplary embodiment of the present invention.

FIG. 7 shows the barrier 300 that is driven to have a zigzag shape according to the second exemplary embodiment of the present invention.

The barrier driver 200 applies the reference voltage to the second electrode set set 2 of the first substrate 301 and the fourth electrode set set 4 of the second substrate 302, and applies liquid crystal driving voltages to the first electrode set set 1 of the first substrate 301 and the third electrode set set 3 of the second substrate 302.

By driving like this, as shown in FIG. 7, a voltage difference does not occur in overlapped regions of the second electrodes 306 and the fourth electrodes 309, because the reference voltage is applied to both the second electrodes 306 and the fourth electrodes 309. Accordingly, the overlapped regions of the second electrodes 306 and the fourth electrodes 309 will become opaque regions. Similarly, a voltage difference does not occur in overlapped regions of the first electrodes 304 and the third electrodes 308, because the liquid crystal driving voltage is applied to both the first electrodes 304 and the third electrodes 308. Accordingly, the overlapped regions of the first electrodes 304 and the third electrodes 308 will become opaque regions.

Meanwhile, a voltage difference occurs in overlapped regions of the second electrodes 306 and the third electrodes 308, thereby driving the liquid crystal, because the reference voltage is applied to the second electrodes 306 and the liquid crystal driving voltage is applied to the third electrodes 308. Accordingly, the overlapped regions of the second electrodes 306 and the third electrodes 308 will become transparent regions. Similarly, a voltage difference occurs in overlapped regions of the first electrodes 304 and the fourth electrodes 309, thereby driving the liquid crystal, because the liquid crystal driving voltage is applied to the first electrodes 304 and the reference voltage is applied to the fourth electrodes 309. Accordingly, the overlapped regions of the first electrodes 304 and the fourth electrodes 309 will become transparent regions.

As shown in FIG. 7, the barrier 300 has a zigzag pattern. Therefore, the barrier 300 is driven in an appropriate form for the landscape mode screen which is rotated 90 degrees from the portrait mode screen shown in FIG. 5C.

In addition, the position of the transparent regions and the opaque regions may be controlled by shifting the electrodes to which the reference voltage or liquid crystal driving voltage is applied. Thereby, an optimal or suitable 3D image can be selectively provided according to the user's position.

According to exemplary embodiments of the present invention, the stripe type barrier and zigzag type barrier can be selectively provided by controlling the voltages to be applied to the electrodes differently.

In addition, a barrier appropriate or suitable for not only the portrait mode but also the landscape mode can be applied to a mobile 3D display device.

While this invention has been described in connection with certain exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A 3D image display device comprising:
a display panel for displaying an image corresponding to an input video signal;
a barrier arranged in correspondence to the display panel, the barrier comprising a first substrate, a plurality of first electrodes disposed on the first substrate and extended in a first direction, a plurality of second electrodes respectively disposed between adjacent ones of the first electrodes on the first substrate, a second substrate opposing the first substrate, a plurality of third electrodes disposed on the second substrate and extended in a second direction crossing the first direction, a plurality of fourth electrodes respectively disposed between adjacent ones of the third electrodes on the second substrate, and a liquid crystal layer disposed between the first substrate and the second substrate;
a controller for generating a barrier control signal for determining a pattern of the barrier; and
a barrier driver for applying, based on the barrier control signal, a reference voltage to the first electrodes, the second electrodes, the third electrodes and/or the fourth electrodes, and for applying a liquid crystal driving voltage to the first electrodes, the second electrodes, the third electrodes and/or the fourth electrodes to which the reference voltage is not applied.

2. The 3D image display device of claim 1,
wherein the barrier further comprises a first connecting electrode coupled to one end of each of the plurality of first electrodes, and
wherein the barrier driver applies the reference voltage or the liquid crystal driving voltage to the plurality of first electrodes through the first connecting electrode.

3. The 3D image display device of claim 2,
wherein the barrier further comprises a second connecting electrode coupled to one end of each of the plurality of second electrodes, and
wherein the barrier driver applies the reference voltage or the liquid crystal driving voltage to the plurality of second electrodes through the second connecting electrode.

4. The 3D image display device of claim 1,
wherein the barrier further comprises a third connecting electrode coupled to one end of each of the plurality of third electrodes, and
wherein the barrier driver applies the reference voltage or the liquid crystal driving voltage to the plurality of third electrodes through the third connecting electrode.

5. The 3D image display device of claim 4,
wherein the barrier further comprises a fourth connecting electrode coupled to one end of each of the plurality of fourth electrodes, and
wherein the barrier driver applies the reference voltage or the liquid crystal driving voltage to the plurality of fourth electrodes through the fourth connecting electrode.

6. The 3D image display device of claim 1, wherein the barrier control signal determines the pattern of the barrier to be a stripe shape or a zigzag shape.

7. The 3D image display device of claim 6, wherein the barrier driver, in response to the barrier control signal for the stripe shape, applies the reference voltage to the first electrodes and the second electrodes, and applies the liquid crystal driving voltage to the third electrodes or the fourth electrodes.

8. The 3D image display device of claim 6, wherein the barrier driver, in response to the barrier control signal for the zigzag shape, applies the reference voltage to the first electrodes and the third electrodes, and applies the liquid crystal driving voltage to the second electrodes and the fourth electrodes.

9. The 3D image display device of claim 1, wherein the reference voltage is a ground voltage, and the liquid crystal driving voltage is an alternating voltage between a positive voltage and a negative voltage with a predetermined frequency.

10. The 3D image display device of claim 1,
wherein the display panel is convertible between a portrait mode and a landscape mode, and
wherein the barrier control signal is determined with reference to the modes in which the display panel is being driven.

11. A barrier device used for a 3D image display panel for displaying a 3D image by using a binocular disparity comprising: a barrier comprising a first substrate on which a plurality of first electrodes and a plurality of second electrodes are disposed, a second substrate on which a plurality of third electrodes and a plurality of fourth electrodes are disposed, and a liquid crystal layer disposed between the first substrate and the second substrate; a barrier driver for applying a first driving voltage to the first electrodes, the second electrodes, the third electrodes, and/or the fourth electrodes, and for applying a second driving voltage to the first electrodes, the second electrodes, the third electrodes, and/or the fourth electrodes to which the first driving voltage is not applied; and a controller for generating a barrier control signal for determining a pattern of the barrier and for transmitting the barrier control signal to the barrier driver, wherein the first electrodes and the second electrodes are arranged alternately in parallel, wherein the third electrodes and the fourth electrodes are arranged alternately in parallel, and wherein the first electrodes and the third electrodes are arranged to cross with each other.

12. The barrier device of claim 11, wherein the barrier driver applies the first driving voltage to the first electrodes and the second electrodes, and applies the second driving voltage to the third electrodes or the fourth electrodes.

13. The barrier device of claim 11, wherein the barrier driver applies the first driving voltage to the first electrodes and the third electrodes, and applies the second driving voltage to the second electrodes and the fourth electrodes 14. A driving method for a 3D image display device comprising a display panel for displaying an image corresponding to an input video signal and a barrier arranged in correspondence to the display panel,
wherein the barrier comprises:
a first substrate on which a plurality of first electrodes are disposed, the first electrodes being extended in a first direction and being apart from each other by a first predetermined gap, and a plurality of second electrodes are respectively disposed between adjacent ones of the first electrodes;
a second substrate on which a plurality of third electrodes are disposed, the third electrodes being extended in a second direction crossing the first direction and being apart from each other by a second predetermined gap, and a plurality of fourth electrodes are respectively disposed between adjacent ones of the third electrodes; and a liquid crystal layer disposed between the first substrate and the second substrate, the method comprising:

a) applying a first driving voltage to the first electrodes and the second electrodes, while concurrently applying a second driving voltage to the third electrodes or the fourth electrodes;

b) displaying an image corresponding to the video signal on the display panel;

c) applying the first driving voltage to the first electrodes and the third electrodes, while concurrently applying the second driving voltage to the second electrodes and the fourth electrodes; and d) displaying an image corresponding to the video signal on the display panel.

15. The driving method of claim 14, wherein the first driving voltage is a ground voltage, and the second driving voltage is a liquid crystal driving voltage for driving the liquid crystal layer.

16. The driving method of claim 14, wherein the barrier further comprises:

a first connecting electrode extended in the second direction, the first connecting electrode for coupling the first electrodes by connecting one end of each of the first electrodes; and a second connecting electrode arranged opposite to the first connecting electrode and extended in the second direction, the second connecting electrode for coupling the second electrodes by connecting one end of each of the second electrodes, wherein in the a), the first driving voltage is applied to the first connecting electrode and the second connecting electrode, and wherein in the c), the first driving voltage is applied to the first connecting electrode, and the second driving voltage is applied to the second connecting electrode.

17. The driving method of claim 14, wherein the barrier further comprises:

a third connecting electrode extended in the first direction, the third connecting electrode for coupling the third electrodes by connecting one end of each of the third electrodes; and a fourth connecting electrode arranged opposite to the third connecting electrode and extended in the first direction, the fourth connecting electrode for coupling the fourth electrodes by connecting one end of each of the fourth electrodes, wherein in the a), the second driving voltage is applied to the third connecting electrode or the fourth connecting electrode, and wherein in the c), the first driving voltage is applied to the third connecting electrode, and the second driving voltage is applied to the fourth connecting electrode.

* * * * *

UNITED STATES PATENT AND TRADEMARK OFFICE
CERTIFICATE OF CORRECTION

PATENT NO.       : 8,059,063 B2                                                      Page 1 of 1
APPLICATION NO.  : 11/355372
DATED            : November 15, 2011
INVENTOR(S)      : Hui Nam et al.

It is certified that error appears in the above-identified patent and that said Letters Patent is hereby corrected as shown below:

In the Claims

Column 10, Claim 13, line 49.          Delete the second occurrence of "electrodes"

Insert -- electrodes. --

Signed and Sealed this
Ninth Day of April, 2013

Teresa Stanek Rea
*Acting Director of the United States Patent and Trademark Office*